United States Patent
Geddes et al.

(10) Patent No.: US 7,409,356 B1
(45) Date of Patent: *Aug. 5, 2008

(54) METHOD AND SYSTEM FOR INTELLIGENT SUPPLY CHAIN COLLABORATION

(75) Inventors: Norman D. Geddes, Cumming, GA (US); Douglas M. Hosmer, Marietta, GA (US)

(73) Assignee: Applied Systems Intelligence, Inc., Roswell, GA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 09/598,239

(22) Filed: Jun. 21, 2000

(51) Int. Cl.
*G06F 9/44* (2006.01)

(52) U.S. Cl. .......................................... 705/7
(58) Field of Classification Search ............... 705/1, 705/7, 10; 706/46; 707/3, 104.1; 717/101; 709/219, 224, 100; 713/168
See application file for complete search history.

(56) References Cited

U.S. PATENT DOCUMENTS

| | | | |
|---|---|---|---|
| 4,658,370 A | 4/1987 | Erman et al. .................. 706/60 |
| 5,167,010 A | 11/1992 | Elm et al. ..................... 395/50 |
| 5,299,287 A | 3/1994 | Tsuruta et al. ................ 395/51 |
| 5,359,649 A | 10/1994 | Rosu et al. ................... 379/220 |
| 5,406,477 A | 4/1995 | Harhen |
| 5,428,619 A | 6/1995 | Schwartz et al. |
| 5,434,952 A | 7/1995 | Yen et al. |
| 5,442,731 A | 8/1995 | Tanaka et al. ................. 395/54 |
| 5,504,837 A | 4/1996 | Griffeth et al. ................ 706/10 |
| 5,550,746 A | 8/1996 | Jacobs |
| 5,583,763 A | 12/1996 | Atcheson et al. |
| 5,586,254 A | 12/1996 | Kondo et al. |
| 5,644,727 A | 7/1997 | Atkins |
| 5,655,081 A | 8/1997 | Bonnell et al. ......... 395/200.32 |
| 5,701,400 A * | 12/1997 | Amado ....................... 706/45 |
| 5,706,406 A | 1/1998 | Pollock |
| 5,712,960 A | 1/1998 | Chiopris et al. |
| 5,724,263 A | 3/1998 | Raguram et al. |
| 5,732,398 A | 3/1998 | Tagawa |
| 5,745,895 A | 4/1998 | Bingham et al. .............. 707/10 |
| 5,754,850 A | 5/1998 | Janssen |

(Continued)

FOREIGN PATENT DOCUMENTS

WO          WO99/08208          *    2/1999

(Continued)

OTHER PUBLICATIONS

Pilot's associate, A cooperative, Knowledge-Based System Application. Sheila B. Banks et al, Wright-Patterson Airforce Base, IEEE Expert, 0885/9000/91/0600-001, 1991.*

(Continued)

*Primary Examiner*—Susanna M. Diaz
(74) *Attorney, Agent, or Firm*—Michael J. Dimino; King & Spalding LLP

(57) ABSTRACT

An improved supply chain management system and method is disclosed for assisting companies to improve the efficiency of supply chains. One embodiment includes a partial order planner to better handle the changes and uncertainties that inevitably occur in the real-world. One embodiment of the invention provides a supply chain management system that enables collaboration by exchanging business objectives and plans. An additional embodiment of the present invention includes an intent interpreter module that supports the implementation of intelligent decision support functionality in a graphical user interface.

18 Claims, 10 Drawing Sheets

U.S. PATENT DOCUMENTS

| | | | | |
|---|---|---|---|---|
| 5,768,578 | A | 6/1998 | Kirk et al. | 707/100 |
| 5,778,150 | A | 7/1998 | Chan et al. | 706/46 |
| 5,799,317 | A | 8/1998 | He et al. | 707/104.1 |
| 5,809,212 | A * | 9/1998 | Shasha | 706/46 |
| 5,835,922 | A | 11/1998 | Shima et al. | 707/522 |
| 5,845,258 | A | 12/1998 | Kennedy | |
| 5,893,083 | A | 4/1999 | Eshghi et al. | |
| 5,901,246 | A | 5/1999 | Hoffberg et al. | 382/209 |
| 5,905,715 | A | 5/1999 | Azarmi et al. | |
| 5,918,207 | A | 6/1999 | McGovern et al. | |
| 5,953,707 | A * | 9/1999 | Huang et al. | 705/10 |
| 5,958,012 | A | 9/1999 | Battat et al. | 709/224 |
| 5,963,447 | A | 10/1999 | Kohn et al. | |
| 5,974,395 | A | 10/1999 | Bellini et al. | |
| 5,983,200 | A | 11/1999 | Slotznick | |
| 5,995,959 | A * | 11/1999 | Friedman et al. | 707/3 |
| 6,006,192 | A | 12/1999 | Cheng et al. | |
| 6,012,044 | A | 1/2000 | Maggioncalda et al. | |
| 6,012,051 | A | 1/2000 | Sammon, Jr. et al. | |
| 6,012,152 | A | 1/2000 | Douik et al. | |
| 6,026,375 | A | 2/2000 | Hall et al. | |
| 6,049,742 | A | 4/2000 | Milne et al. | |
| 6,076,099 | A | 6/2000 | Chen et al. | 709/202 |
| 6,092,102 | A | 7/2000 | Wagner | 340/7.29 |
| 6,115,690 | A * | 9/2000 | Wong | 705/7 |
| 6,134,580 | A | 10/2000 | Tahara et al. | 709/202 |
| 6,151,601 | A | 11/2000 | Papierniak et al. | 707/10 |
| 6,154,213 | A | 11/2000 | Rennison et al. | 715/854 |
| 6,247,012 | B1 | 6/2001 | Kitamura et al. | 707/10 |
| 6,263,358 | B1 * | 7/2001 | Lee et al. | 709/100 |
| 6,272,482 | B1 | 8/2001 | McKee et al. | |
| 6,292,811 | B1 | 9/2001 | Clancey et al. | 715/503 |
| 6,292,830 | B1 * | 9/2001 | Taylor et al. | 709/224 |
| 6,292,894 | B1 * | 9/2001 | Chipman et al. | 713/168 |
| 6,314,555 | B1 * | 11/2001 | Ndumu et al. | 717/101 |
| 6,360,193 | B1 | 3/2002 | Stoyen | 703/17 |
| 6,449,640 | B1 * | 9/2002 | Haverstock et al. | 709/219 |
| 6,484,155 | B1 | 11/2002 | Kiss et al. | 706/46 |
| 6,567,822 | B1 * | 5/2003 | Cudahy et al. | 707/104.1 |
| 6,725,428 | B1 | 4/2004 | Pareschi et al. | 715/530 |
| 6,741,975 | B1 | 5/2004 | Nakisa et al. | 706/47 |
| 6,826,552 | B1 | 11/2004 | Grosser et al. | 706/47 |
| 6,850,923 | B1 | 2/2005 | Nakisa et al. | 706/47 |
| 6,901,384 | B2 | 5/2005 | Lynch et al. | 705/38 |
| 2001/0021917 | A1 | 9/2001 | Hatano | 705/26 |
| 2002/0087496 | A1 | 7/2002 | Stirpe et a. | 706/45 |
| 2002/0095605 | A1 | 7/2002 | Royer et al. | 726/7 |

FOREIGN PATENT DOCUMENTS

| | | |
|---|---|---|
| WO | WO 01/16704 | 3/2001 |

OTHER PUBLICATIONS

Pilot's Associate, A Cooperative, Knowledge-Based System Application. Banks et al., 1991.*

An Introduction to Least Commitment Planning. Daniel S. Weld, pp. i-ii and 1-51, Summar/Fall 1994.*

Microsoft Computer Dictionary, Third Edition, pp. i, 19, 256 and 260. 1997.*

Weld, Daniel S. "Recent Advances in AI Planning." AI Magazine, vol. 20, No. 2, p. 93, Summer 1999.*

Hess, Traci J. "Using Autonomous Software Agents to Create Next Generation of Decision Support Systems." Decision Sciences, vol. 31, No. 1, p. 1, Mar. 31, 2000.*

Preliminary Examination Report for Application No. PCT/US01/19714, dated May 27, 2003 (mailing date).

Preliminary Examination Report for Application No. PCT/US01/19652, dated Feb. 11. 2003.

International Search Report for Application No. PCT/US01/19716, dated Oct. 10, 2001 (mailing date).

International Search Report for Application No. PCT/US01/19714, dated Sep. 18, 2001 (mailing date).

International Search Report for Application No. PCT/US01/19713, dated Sep. 6, 2001 (mailing date).

Kanai, Naoki, et al., "An Expert System to Assist Production Planning," *IEEE, International Workshop on Artificial Intelligence for Industrial Applications*, pp. 219-224, 1988.

Written Opinion for Application No. PCT/US01/19714, dated May 18, 2002 (mailing date).

"ERP Goes Mid-Market," *Modern Materials Handling*, v. 55, n. 1, p. 65, Jan. 2000.

Jedd, Marcia, "The Next Big Thing," *World Trade*, v. 12, n. 2, pp. 60-62, Feb. 1999.

Geddes, N. D., Smith, D. M., and Kizza, C. S., (1998) *Fostering Collaboration in System of Systems*, 1998 IEEE International Conference on Systems, Man and Cybernetics, Oct. 11-14, 1998, La Jolla, CA.

Geddes, N. D., and Lee, Robert J. (1998) *Intelligent Control for Automated Vehicles: A Decision Aiding Method for Coordination of Multiple Uninhabited Tactical Aircraft*, AUVSI '98 25th Annual Symposium and Exhibition, Jun. 8-12, 1998, Huntsville, AL.

Collis, J. C. and Lee, L. C., *Building Electronic Marketplaces with the ZEUS Agent Tool-Kit*, Agent Mediated Electronic Commerce, First International Workshop on Agent Mediated Electronic Trading, AMET-98, May 10, 1998, Minneapolis, MN.

Geddes, N. D., (1997) *A Portable Lightweight Associate For Urban Helicopter Pilotage*, 16th AIAA Digital Avionics Systems Conference, Oct. 1997, Irvine, CA.

Geddes, N. D., (1997) *Associate Systems: A Framework for Human-Machine Cooperation*, HCI Conference, Aug. 24-29, 1997, San Francisco, CA.

Geddes, N. D., (1997) *Human Centered Approaches to Mixed Initiative Planning*, May 6, 1997, DARPA P&DA Program.

Wegner, Peter, "Why Interaction is More Powerful Than Algorithms," *Communications of the ACM*, v. 40, n. 5, pp. 80-91, May 1997.

Geddes, N. D., (1997) *Large Scale Models of Cooperative and Hostile Intentions*, IEEE Computer Society International Conference and Workshop on Engineering of Computer Based Systems (ECBS '97), Mar. 24-28, 1997, Monterey, CA.

Gilbert, D. and Janca, P., *Intelligent Agents: Internet Usability Enhancers*, 19th Annual Pacific Telecommunications Conference, PTC '97, pp. 677-682.

"Smart Move in a Networked World," *Computer Reseller News*, 1997, n. 731, p. 117.

Ross, Julie Ritzer, *"Intelligent Agent" Test Probes Consumers' On-Line Shopping Need Stores*, v. 78, n. 11, pp. 47-48, Nov. 1996.

Geddes, N. D., and Brown, J. L., (1996) *A Shared Model of Intentions for Free Flight*, AIAA/IEEE Digital Avionics Systems Conference, 179-184, Oct. 27-31, 1996, Atlanta, GA.

Houlder, Vanessa, *Technology: Fingers That Shop Around Retailing Faces on Upheaval Caused by "Intelligent Agents" on the Internet*, Financial Times London Edition, p. 14, Sep. 24, 1996.

"Andersen Project Examines How Electronic Merchants Can Better Target Customers," *Software Industry Report*, v. 28, n. 17, p. 1(2), Sep. 2, 1996.

"New Intelligent Agent Tackles Internet Privacy Issues: Andersen Consulting Experiment Examines How Electronic Merchants Can Better Target Customers in Cyberspace," *Business Wire*, p. 8271291, Aug. 27, 1996.

Renwei, Li and Pereira, L. M., *Knowledge-Based Situated Agents Among Us, Intelligent Agents III, Agent Theories, Architectures and Languages*, ECAI '96 Workshop, Aug. 12-13, 1996, Budapest, Hungary.

Laborie, P. and Ghallab, M., *Planning With Sharable Resource Constraints*, IJCAI-95 Proceedings of the 14th International Joint Conference on Artificial Intelligence, vol. 2, pp. 1643-1649, Aug. 20-25, 1995, Montreal, Quebec, Canada.

Correll, James G., "Re-Engineering the MRP II Environment: The Key is Successfully Implementing Change," *IIE Solutions*, v. 27, n. 7, pp. 24-27, Jul. 1995.

Shalin, V. L. and Geddes, N. D., (1994) *Task Dependent Information Management in a Dynamic Environment: Concept and Measurement Issues*, IEEE 1994.

Geddes, N. D., (1994) *A Model for Intent Interpretation for Multiple Agents with Conflicts*, IEEE International Conference on Systems, Man and Cybernetics, Oct. 2, 1994, San Antonio, TX.

Soutchanski, M. and Ternovskaia, E., *Logical Formalization of Concurrent Actions for Multi-Agent Systems, Intelligent Agents*, ECAI-94 Workshop on Agent Theories, Architectures and Languages, Aug. 8-9, 1994, Amsterdam, Netherlands.

Etzioni, Oren and Weld, Daniel, "A Softbot-Based Interface to the Internet," *Communications of the ACM*, v. 37, n. 7, pp. 72-76, Jul. 1994.

Eklund, Peter W., "Research Developments in Multiple Inheritance with Exceptions," *The Knowledge Engineering Review*, v. 9, n. 1, pp. 21-55, Mar. 1994.

Shalin, V. L., Geddes, N. D., Mikesell, B., and Ramamurthy, M., (1993) *Evidence for Plan-Based Performance and Implications for Information Management on the Commercial Aviation Flight Deck*, 4$^{th}$ International Conference on Human-Machine Interaction and AI in Aerospace, Sep. 1993, Toulouse, France.

Shalin, V. L., Geddes, N. D., et al., (1993) *Expertise in Dynamic Physical Task Domain* To appear in Feltovich, P., for, K. & Hoffman, R. (Eds.), *Expertise in Context: Human and Machine*.

Miller, C. A., Shalin, V. L., Geddes, N. D., and Hoshstrasser, B., (1992) *Plan-Based Information Requirements: Automated Knowledge Acquisition to Support Information Management in an Intelligent Pilot-Vehicle Interface*, Proceedings of the 11$^{th}$ Digital Avionics Systems Conference, Seattle, WA, 1992.

Geddes, N. D., Pullum, L., and Hoffman, M. A., (1992) *Intelligent Interfaces in Command and Control Systems*, Proceedings of IEEE Conference on C31 Technology and Applications, Jun. 1-4, 1992, Rome, NY.

Shalin, V. L., Miller, C. A., Geddes, N. D., Hoshstrasser, B. D., and Levi, K. R., (1992) AI Plan as Indicators of Human Information Requirements.

Geddes, N. D., and Hammer, J. M., (1991) "Automatic Display Management Using Dynamic Plans and Events," *Proceedings of the 6$^{th}$ Symposium on Aviation Psychology* May 6-11, 1991, Columbus, OH.

Edwards, G. R., and Geddes, N. D., (1991) "Deriving a Domain-Independent Architecture for Associate Systems From Essential Elements of Associate Behavior," *Associate Technology: Opportunity and Challenges*, Lehner, P. E. (Editor), Fairfax, VA: George Mason University, Jun. 1991, pp. 17-29.

Lizza, C. S., Banks, S. B., (1991) *Pilot's Associate: A Cooperative, Knowledge-Based System Application*, DARPA Strategic Computing Initiative, IEEE Expert, Jun. 1991.

Chandrasekaran, B., Bhatnagar, R., and Sharma, D. D., "Real-Time Disturbance Control," *Communications of the ACM*, v. 34, n. 8, p. 32(16), Aug. 1991.

Shalin, V. L., Geddes, N. D., Hoshstrasser, B. D., Miller, C. A., Levi, K. R., and Persbacher, D. L., (1990) "Towards a Theory of Pilot Information Requirements During Plan Development and Execution," *Proceedings of CERT 90*, Toulouse, France.

Sewell, D. R., and Geddes, N. D., (1990) "A Plan and Goal Based Method for Computer-Human System Design," *Human Computer Interaction: INTERACT 90*, New York: North Holland, 283-288.

Rouse, W. B., Geddes, N. D., and Hammer, J. M., (1990) "Computer-Aided Fighter Pilots," *IEEE Spectrum*, Mar. 1990, 38-41.

Geddes, N. D. and Hoffman, M.A., (1990) "Supervising Unmanned Roving Vehicles Through an Intelligent Interface," *Proceedings of the 1990 Space Operations and Robotics Conference*, Albuquerque, NM.

Hoshstrasser, B. D. and Geddes, N. D., (1989) "OPAL: Operator Intent Inferencing for Intelligent Operator Support Systems," *Proceedings of the IJCAI-89 Workshop on Integrated Human-Machine Intelligence in Aerospace Systems*, Shalin, V. L. and Boy, G. A. (Editors), Aug. 1989, Detroit, MI.

Webb, B. W., Geddes, N. D., and Neste, L. O., (1989) "Information Management with a Hierarchical Display Generator," *Proceedings of the National Computer Graphics Association*, Washington, DC.

Howard, C. W., Hammer, J. M., and Geddes, N. D., (1988) "Information Display Management in a Pilot's Associate," *Proceedings of the 1988 Aerospace Applications of Artificial Intelligence Conference*, 1, 339-349.

Sewell. D. R., Geddes, N. D., and Rouse, E. B., (1987) "Initial Evaluation of an Intelligent Interface for Operators of Complex Systems." On G. Salvendy (Eds), *Cognitive Engineering in the Design of Human-Computer Interaction and Expert Systems* (551-558), New York: Elsevier.

Rouse, W. B., Geddes, N. D., and Curry, R. E., (1987) "An Architecture for Intelligent Interfaces: Outline of an Approach to Supporting Operators of Complex Systems," *Human-Computer Interaction*, 3, 87-122.

Hammer, J. M. and Geddes, N. D., (1987) *Design of an Intelligent Monitor for Human Error in a Complex System*, Paper presented at AIAA Computers in Aerospace VI Conference, Wakefield, MA.

Geddes, N. D., (1986) "The Use of Individual Differences in Inferring Human Operator Intentions," *Proceedings of the Second Annual Aerospace Applications of Artificial Intelligence Conference*, 30-41.

Geddes, N. D., (1985) "Intent Inferencing Using Scripts and Plans," *Proceedings of the First Annual Aerospace Applications of Artificial Intelligence Conference*, 160-172.

McCarthy, John, "Nonmonotonic Reasoning," *Partial Formalizations and the Lemmings Game* [online], Mar. 2, 1998 [retrieved on Dec. 10, 2003], Retrieved from the Internet: <http://www-formal.Stanford.edu/jmc/lemmings/node22.html>.

Kappa-PC, "Object Browser" [online], [retrieved on Dec. 8, 2003], Retrieved from the Internet: <http://www.intellicorp.com/products/kappapc/download/kappa_pc_download.htm>.

Corkill, Daniel D., "Blackboard Systems," *AI Expert*, vol. 6, No. 9, pp. 40-47, Sep. 1991.

Rich, Elaine, "Artificial Intelligence," pp. 40-45, 72-75, 201, 204-207, 214-223, 247-277, and 284-285, New York: McGraw Hill (ISBN 0-07-052261-8), 1983.

Rao, Anand S. and Georgeff, Michael P., "Intelligent Real-Time Network Management," Technical Note 15, 16 pp., Apr. 1991.

Supplementary European Search Report for Application No. EP 01 95 0351, dated Oct. 10, 2007.

Weld, Daniel S., "Recent Advances in AI Planning," Oct. 8, 1998, University of Washington, 1-49.

Tambe, Milind, "Tracking Dynamic Team Activity," University of Southern California, Marina del Rey, CA, *Proceedings of the 1966 13$^{th}$ National Conference on Artificial Intelligence, AAAI 96, Part 1 (of 2)*, Held at Portland, Ohio, Aug. 4, 1996 to Aug. 8, 1996.

Barrett, Anthony, et al., "Partial Order Planning: Evaluating Possible Efficiency Gains," Feb. 19, 1993, University of Washington, 1-50.

Friedman, Marc, et al., "Least-Commitment Action Selection," University of Washington, 8 pp.

Murayama, et al., "An Interference Mechanism Suited for Real-Time Control," Commun. & Inf. Process Labs., Ntt Corp., Kanagawa, Japan, *Proceedings of the Second International Conference on Industrial and Engineering Applications of AI and Expert Systems*, 1989.

Schank, R. C. and Riesbeck, C. K., "Inside Computer Understanding," Hillsdale, NJ, Lawrence Erlbaum Associates, Copyright 1981, 6 pp.

Charniak, E., Riesbeck, C. K., and McDermott, D., "Artificial Intelligence Programming," Hillsdale, NJ, Lawrence Erlbaum Associates, Copyright 1980, 7 pp.

Schank, R. C. and Abelson, R., "Scripts, Plans, Goals and Understanding, an Inquiry Into Human Knowledge Structures," Hillsdale, NJ, Lawrence Erlbaum Associates, Copyright 1977, 6 pp.

Sacerdoti, E. D., "A Structure for Plans and Behaviors," New York Elsevier, Copyright 1977, 6 pp.

Rinnooy, Kan, A.H.G., "Machine Scheduling Problems," The Hague, Martinus Nijhoff (1976), 5 pp.

\* cited by examiner

METHOD AND SYSTEM FOR INTELLIGENT SUPPLY CHAIN COLLABORATION

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of supply chain management, and more particularly to an intelligent supply chain collaboration system that uses shared knowledge about business objectives and business situations to effect collaboration between business entities without reducing autonomy for the collaborating businesses. The intelligent supply chain collaboration system uses a partial order planner to more effectively handle ever changing real-world business situations. The present invention provides a supply chain collaboration system using an intent interpreter module to implement intelligent decision support functionality.

BACKGROUND INFORMATION

An enterprise resource planning (ERP) system is a software system designed to support and automate an organization's business processes. ERP systems are often touted as attempts to provide a single solution for integrating business processes across an organization, or even across an entire supply chain, tying inventory control systems, manufacturing resource planning, sales and order management, marketing, purchasing, warehouse management, financial and managerial accounting, and human resource management so that all business processes are at the fingertips of corporate executives. In effect, ERP is an attempt to reduce all aspects of a business to a model that can then be tested, simulated, modified, refined, and examined so that a corporate manager can increase the efficiency of the entire business.

The use of ERP systems has increased business efficiency, especially for large, complex manufacturing operations. By providing the ability to simulate various scenarios, ERP systems assist managers to more effectively handle business process problems such as shortages, labor problems, quality control problems, etc. In short, by reducing business processes to a model of resources and constraints, ERP systems provide a tool for viewing the current state of an operation and a test bed for considering modifications to business processes.

Conventional ERP systems provide a mechanism for companies to perform Manufacturing Resource Planning (MRP) and Distribution Resource Planning (DRP), separately analyzing and planning for demand and supply.

A supply chain includes individuals and organizations that manufacture, assemble, and distribute products and materials including suppliers, manufacturers, distributors, wholesalers, retailers, and consumers, as well as the relationships between them. In a supply chain, one participant's supply is another's demand. While it can be useful to analyze supply and demand separately when looking at a company in isolation, it is useful to consider demand and supply simultaneously to evaluate the efficiency of an entire supply chain. Several vendors realized this need and developed supply chain management (SCM) systems to assist in planning, scheduling, and control of supply chains. Examples of commercially available SCM systems include those marketed by Manugistics™, I2™, Baan™, SAP™, PeopleSoft™, and Oracle™. Most of these systems attempt to optimize supply chains with the goal of reducing inventories. In addition companies such as Ariba™ and Commerce One™ have developed approaches to linking businesses together to reduce transaction costs by providing tools for creating business-to-business electronic commerce marketplaces.

Instead of focusing inward on the business processes within an enterprise as done by conventional ERP systems, SCM systems focus outwards on the supply chain as a whole, taking into consideration data from various enterprises participating in the supply chain. Conventional supply chain management systems provide great improvements over ERP systems in that they provide faster response and they consider supply and demand constraints simultaneously.

However, SCM system, just as conventional ERP systems operate by treating business process modeling and simulation as a scheduling problem. A business is modeled as a collection of resources and constraints whereby a company must determine how best to use its limited resources to achieve the largest benefit attainable. By solving the scheduling problem, conventional ERP and SCM systems attempt to provide a fully-ordered plan that optimally solves the problem presented to it.

Scheduling is a subproblem of the more general problem of planning. To characterize this, the following definitions are broadly accepted:

Scheduling subproblem: given a set of activities $a_1 \ldots a_n$, with precedent relationships $a_j > a_k$, and a set of resources $r_1 \ldots r_m$ needed to perform the activities, what is the best allocation and ordering of the activities and resources. Best is normally expressed as the optimal value of some expression $J(r_i)$ that is related to the cost of the resources used and the benefits obtained.

Planning subproblem: given one or more objectives, what is the best set of activities $a_1 \ldots a_n$ and what are the precedence relationships $a_j > a_k$ that exist between them to accomplish the desired objectives.

Clearly, these definitions imply that the scheduling subproblem cannot be approached until after the planning subproblem has been solved. In addition, each of these subproblems, when formulated for real-world cases other than relatively trivial textbook examples, are easily within the class of problems known in computing theory as NP-Complete.

Current approaches to ERP and SCM typically assume a static set of activities as the business model. In pursuing a resource allocation, these ERP and SCM optimization processes can change attributes of activities, such as start and end times and allocation of resources to activities, but conventional ERP and SCM systems do not seek to change the set of activities themselves. This static set of activities defines a static business model.

Unfortunately, a static business model cannot be completely accurate and cannot account for all contingencies. Often, the optimal schedule is not the best means to handle the uncertainties of the real world because it is not the most robust. In the real world, requirements and resources are not static. The operation of a business is a dynamic process and it is desirable to provide a supply chain management system that can better handle the inevitable changes that confront a corporate manager every day.

Determining an optimal schedule is often inefficient because the available resources and constraints in real-world problems change over time. Before an optimal plan is carried out, a change will often force reconsideration and recalculation of that plan. Because solving the optimal scheduling subproblem is typically very computationally expensive, changes may occur in the pre-conditions before the result can even be calculated. Optimal schedulers do not have a mechanism for graded levels of commitment to activities and their parameters. When a change occurs, the entire schedule must be re-computed. As a result, a small change in input values to the optimal scheduler can produce a large change in the resulting schedule. Activities that were once possible to schedule may now become unscheduled.

A supply chain management system that creates a partially ordered plan with graded levels of commitment is desirable. Such a system could quickly calculate the next action to take without expending the resources necessary to calculate a so-called "optimal" plan. In addition, such a system can maintain important commitments while rearranging other activities to accommodate changes. Attempts to create and implement an optimal schedule often require numerous modifications to the schedule before reaching the end.

Additionally, as business processes become more complex and as models become more detailed, the optimal planning mechanisms of conventional SCM systems take longer and longer to complete a so-called "optimal" plan that will probably need to be modified. It is therefore desirable to provide a planning mechanism that is faster than conventional optimal, fully-ordered planners. Corporate managers desire fast, perhaps even real-time feedback to cope with dynamic business situations.

Conventional SCM systems aggregate data from each participant to a central data repository. Once data has been collected, these systems use a centralized process to analyze the data and implement any collaboration. In a perfect world with static data, complete information, and perfect business models, conventional SCM systems are excellent tools for determining an optimal plan. However, in the real world with incomplete information, overly simplified business process models, and ever-changing resources and constraints, conventional SCM systems are inadequate. There is a need for a distributed system without central control whereby participants can maintain control over their own data. Within this system, participants can analyze the data available to them and that made available by other supply chain participants from the perspective of an individual participant that can freely choose how to collaborate with his business partners.

Each participant in a supply chain can benefit by using an SCM system; however, the SCM system needs information about each participant's business to be effective. If the system does not have access to the resources and constraints of a participant, it cannot assist in improving the supply chain with regard to that participant. On the other hand, the data used by the SCM system is often very sensitive business data. In many supply chains, participants may be competitors, or they may not trust some or all of the other participants. There is a desire for a SCM system that provides a data security mechanism so that a participant can precisely control access to its sensitive business data.

Conventional SCM systems allow supply chain participants to collaborate by storing data from various sources in a common data repository. Once the data has been collected, a company can analyze the data together to reach consensus. There is a desire for a SCM system that can perform real-time collaboration and "what-if" analysis using data provided by multiple supply chain participants.

Conventional SCM systems allow participants to collaborate by pooling data and then analyzing the pooled data together by computing an optimal supply chain plan. In many situations, this model of collaboration is insufficient; an optimal supply chain as determined by conventional SCM systems is not always in the best interest of an individual participant or the chain at large. This is because the conventional SCM systems based on static activity models treat costs and benefits as zero-sum quantities. That is, in order for one participant to increase his gain, others must reduce their gains.

However, if activities themselves can be changed, opportunities can be found to increase the total gain, not merely reallocate it. Instead of obtaining an optimal plan for the entire chain, a participant is more interested in determining how changes by others will affect that participant and how changes by that participant will affect others. For example, a supplier would be very interested in knowing that a delivery of parts on April 1 instead of April 15 would save another participant 5 cents for each unit delivered. With this knowledge, the supplier can negotiate a more favorable price. For example, the participant may be willing to give the supplier 3 cents more per unit if he is able to save 2 cents per unit. It is desirable to provide a system that can determine how changes in activities made by one supply chain participant will affect the costs of others.

Each participant, acting freely in his informed best interest, may still change his activities in a way that is harmful to his supply chain partners. Often, well-intentioned changes in business plans produce unwanted side effects that reduce the potential benefits or increase the costs of the supply chain. It is desirable to provide a system that can automatically detect and analyze conflicting activities within the supply chain and alert those affected.

Additionally, conventional SCM systems includes user interfaces that permit participants to visualize the entire supply chain. As SCM systems grow, a user can quickly become inundated with data. There is a desire for an intelligent graphical user interface that can determine the intent of a user and adjust the display accordingly to display items most pertinent to that user.

Several patents disclosing SCM systems have been issued by the United States Patent and Trademark Office. For example, U.S. Pat. No. 5,953,707 to Huang et al. (the '707 patent) discloses a system that allows a decision maker to view a supply chain and generate an integrated production, sales, and inventory plan. The 707 patent discloses a way to provide dynamic decision support to users; however, the system does not refer to knowledge explicitly and it is module oriented rather than goal oriented. The system disclosed in the '707 patent would benefit from the use an intent interpreter and a planner that uses decomposition planning to plan activities within the chain as disclosed in the present invention.

Additionally, U.S. Pat. No. 5,974,395 to Bellini et al. (the '395 patent) discloses a system for extended enterprise planning across a supply chain planning engine. The '395 patent suffers from the deficiencies described above. For example, it uses a constraint-based, centralized planning engine without any support for conflict detection.

It is desirable to provide a system and method for intelligent supply chain collaboration that overcomes the problems, weaknesses, and deficiencies found in conventional SCM systems.

SUMMARY OF THE INVENTION

In accordance with the present invention, a system for conducting supply chain management (SCM) using partial order planning is provided. The system includes a knowledge base for storing expert knowledge about one or more business processes domains, an inference engine coupled to the knowledge base that includes a partial order planner, a management system that collects and distributes data regarding one or more business processes and determines one or more goals, and a graphical user interface system that displays information regarding business processes. The inference engine uses the partial order planner to determine a plan for achieving determined goals.

BRIEF DESCRIPTION OF THE DRAWINGS

The present invention is further described in the detailed description which follows, by reference to a plurality of drawings by way of non-limiting examples of illustrated embodiments of the present invention, in which like reference numerals represent similar parts throughout the several drawings, and wherein.

GLOSSARY

Figure 1:
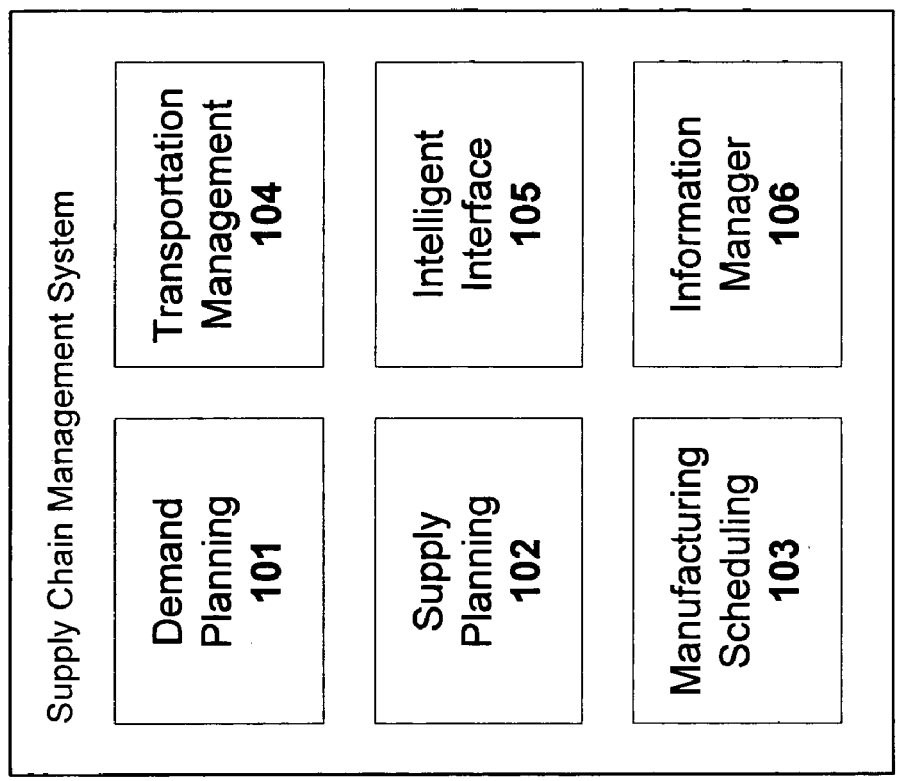
FIG. 1 is a block diagram illustrating a typical supply chain collaboration system according to an embodiment of the present invention.

Concept Graph: a knowledge representation of the dependencies between observable data values and higher-level computations and assertions made about the data. A concept graph can be implemented as a directed acyclic graph of concept nodes that is a particular type of augmented transition network (ATN).

Expert System: a computer program that uses a knowledge base to assist in solving problems. Most expert systems use an inference engine to derive new facts and beliefs using a knowledge base.

Full-Order Planner: (also called a total-order planner) a process that computes a fully-ordered list of primitive steps or actions to reach a goal, in which each step or action is fully definitized at the completion of the planning process.

Inference Engine: a computer program that infers new facts or beliefs from known facts or beliefs using a knowledge base and a set of logical operations.

Intent Interpreter: an expert system that uses a knowledge base to determine the present intention of a user or a system.

Knowledge Base: a collection of knowledge (e.g., objects, concepts, relationships, facts, rules, etc.) expressed in a manner such that it can be used by an inference engine. For example, a knowledge base may include rules and facts or assertions as in traditional expert systems.

Least Commitment Planner: a process that generates a plan that avoids making a choice between two or more alternative courses of action unless it is necessary to do so. A least commitment planner avoids definitizing any particular sub-element of a plan beyond the minimum necessary to determine likely success. Final definitization of the primitive steps is deferred until just prior to the execution of each plan sub-element by a plan execution agent.

Primitive step. a representation of an activity that is not further decomposed by a planner. Also called a primitive action.

Partial-Order Planner: a process that generates a partially ordered set of activities at the completion of the planning process.

Plan. a abstract representation of a set of activities to be performed from the present into the future. A plan may be decomposable into plan sub-elements that define more detailed activities. The lowest level of decomposition of a plan is a primitive step or action.

Plan Execution Agent. a process that directly operates on the environment by performing activities represented by a plan.

Plan-Goal Graph (PGG): a knowledge representation for expressing causal relationships in an operational domain as well as the intentions of a user. A PGG can be expressed as an acyclic, directed graph where plans are decomposed into subgoals or primitive actions.

Planner: a computer program that determines a sequence of operations or actions to be taken to reach one or more goals.

DETAILED DESCRIPTION OF THE ILLUSTRATED EMBODIMENTS

The present invention includes methods and systems for providing intelligent supply chain management services with collaboration and information distribution supported by partial order planning. Conventional Supply Chain Management (SCM) systems are known in the art such as those marketed by Manugistics™, I2™, Baan™, SAP™, PeopleSoft™, and Oracle™. The embodiment described below is a software implementation of the present invention. Using the following description, one of ordinary skill in the art will be able to practice the present invention using conventional software development tools and techniques. The preferred embodiment of the present invention is developed in C++ on a Sun Microsystems™ server running the Solaris™ operating system.

The various embodiments of the present invention improve on traditional artificial techniques. One of ordinary skill in the art may find the following references helpful in providing appropriate background understanding in the design and construction of inference engines, knowledge bases, and various knowledge representations used by the present invention: (1) Schank, R. C. and Abelson, R., Scripts, Plans Goals and Understanding, Hillsdale, N.J.: Lawrence Erlbaum Associates (1977); (2) Schank, R. C. and Riesbeck, C. K., Inside Computer Understanding. Hillsdale, N.J.: Lawrence Erlbaum Associates (1981); (3) Sacerdoti, E. D., A Structure for Plans and Behaviors, New York: Elsevier (1978); (4) Rinnooy Kan, A. H. G., Machine Scheduling Problems. The Hague: Martinus Nijhoff (1976); and (5) Charniak, E, Riesbeck, C. K. and McDermott, D., Artificial Intelligence Programming. Hillsdale, N.J.: Lawrence Erlbaum Associates (1980).

FIG. 1 is a block diagram illustrating a typical SCM system. In this implementation, there several basic components including the following: (1) demand planning 101; (2) supply planning 102; (3) manufacturing scheduling 103; (4) transportation management 104; (5) intelligent interface 105; and (6) information manager 106.

The demand planning 101 subsystem is a tool that assists manufacturers in determining how many products to make based on demand forecasts made using historical data. The supply planning 102 subsystem helps manufacturers stock the supplies needed to manufacture sufficient products to meet the forecasted demand. Supply planning 102 also assists manufacturers in determining the amount of additional supplies that should be stocked to help prevent an assembly line shutdown.

The manufacturing scheduling 103 subsystem assists manufacturers in creating production schedules. The system uses data regarding the available resources, both labor and materials, and any other additional constraints to create and maintain the schedule.

The transportation manager 104 subsystem helps plan, schedule, and track the delivery of goods or services to customers. For example, once goods are manufactured, the transportation manager 104 maintains records of where the goods are located and where their final destination will be, and plans delivery accordingly.

Components similar to those above are found in conventional SCM systems. One of ordinary skill in the art will know how to make and use these components, so the discussion below focuses on the differences between conventional SCM systems and the present invention.

In one embodiment of the present invention, demand planning 101, supply planning 102, manufacturing scheduling 103 and transportation management 104 all utilize an inference engine to assist in creating partial-order plans for meeting business goals. In one embodiment of the present invention, the inference engine that provides these functions is a distributed inference engine that shares the planning processes across a plurality of similar inference engines.

One embodiment of the present invention includes an intelligent interface 105. The intelligent interface 105 is a goal-oriented system that adjusts the display of data according to the plans and goals of a user. In an additional embodiment of the present invention, the intelligent interface 105 interprets the intent of a user to determine goals and adjusts the display of data accordingly.

Finally, information manager 106 maintains data shared by the various supply chain participants. The information manager 106 can enforce data protection and exchanges data with the information managers of other supply chain participants. The shared knowledge is then used by the other components discussed above.

Figure 2:
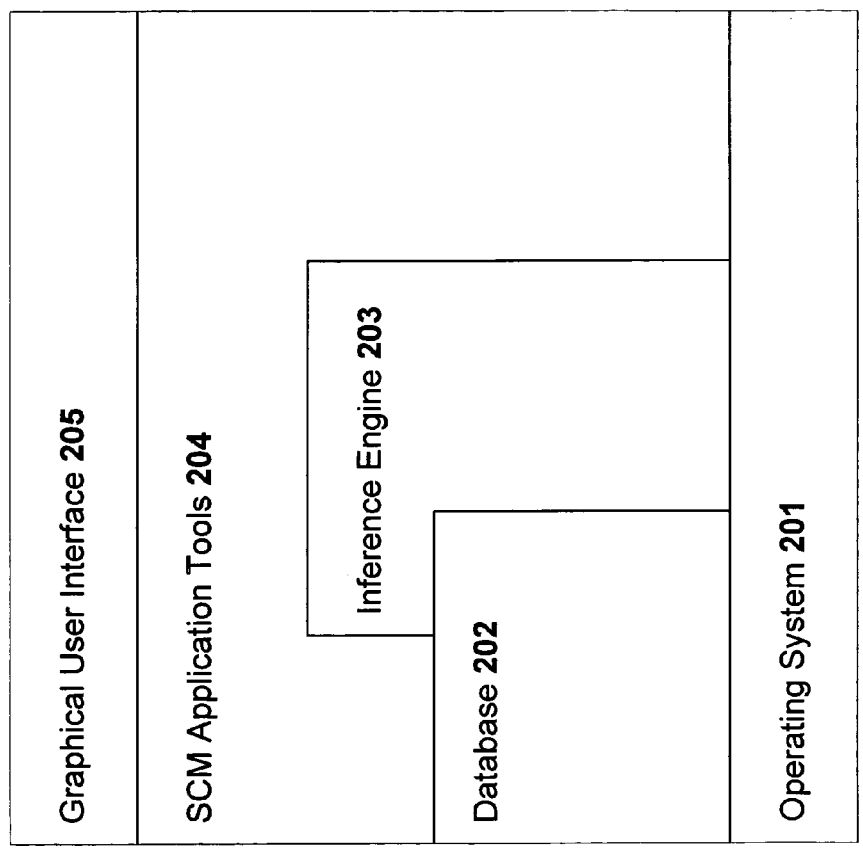
FIG. 2 is a block diagram describing a software implementation of an supply chain collaboration system according to an embodiment of the present invention.

FIG. 2 shows a schematic diagram describing an implementation of any of the planning processes, including demand planning 101, supply planning 102, manufacturing planning 103, or transportation planning 104. In this embodiment, each software component depends on operating system 201. In the preferred embodiment of the present invention, operating system 201 is the Solaris™ operating system that runs on Sun Microsystems™ and Intel™-based computers.

The operating system 201 provides a platform for executing software applications and provides a standardized interface that abstracts from the details of the underlying computer's hardware. A database 202 is run on operating system 201 providing a mechanism for storing, searching, and retrieving large amounts of data. In the preferred embodiment of the present invention, database 202 is an Oracle™ database.

Using database 202 and operating system 201, inference engine 203 provides the tools and framework for performing partial order planning. In conventional SCM systems, inference engine 203 is an optimal scheduler.

The present invention improves on the prior art by providing a partial-order planner as a part of the inference engine 203 to increase the performance and to better handle the uncertainties and challenges encountered in the real-world. In the preferred embodiment, the partial-order planner is a least commitment planner.

Finally, the graphical user interface 205 provides a mechanism for interacting with users by displaying data on a computer screen and by receiving user input from a device such as a mouse, keyboard, or touch screen.

Figure 3:
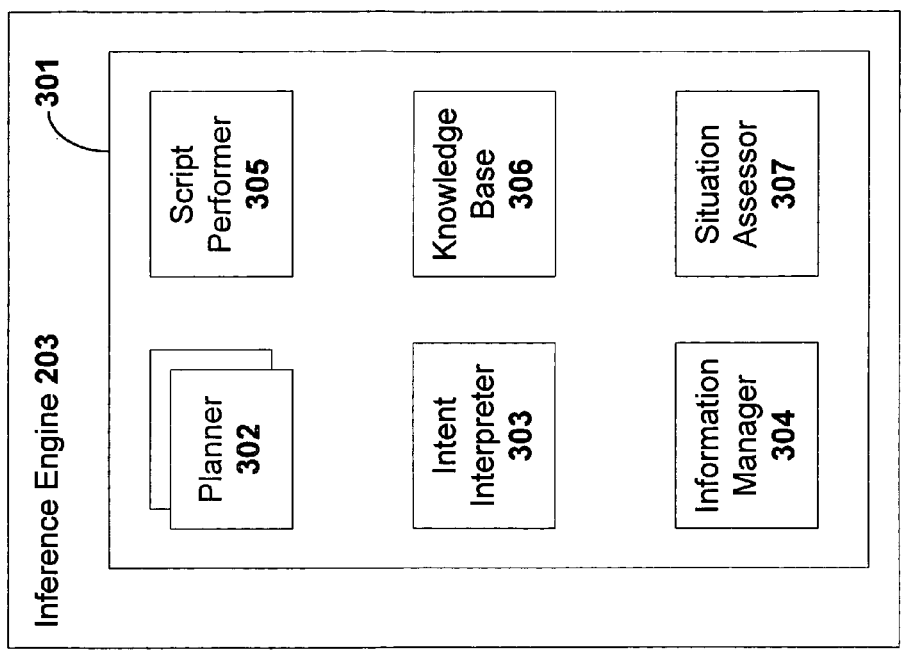
FIG. 3 illustrates an inference engine for performing shared partial order planning according to one embodiment of the present invention.

FIG. 3 is a schematic diagram illustrating inference engine 203 according to one embodiment of the present invention. Inference engine 203 includes one or more planners 302, an intent interpreter 303, an information manager 304, a script performer 305, a knowledge base 306, and a situation assessor 307. Each of these components is described in more detail below. In addition, the following publications describing various exemplary implementations of the constituent components of an inference engine are hereby incorporated by reference: (1) Hoshstrasser, Belinda Hardman and Norman D. Geddes. Proceedings of the International Joint Conferences on Artificial Intelligence 1989 Workshop on Integrated Human-Machine Intelligence in Aerospace Systems. *OPAL: Operator Intent Inferencing for Intelligent Operator Support Systems*. (Aug. 21, 1989); (2) Geddes, Norman D., et al. Fostering Collaboration in System of Systems; (3) Rouse, William B., et al. An Architecture for Intelligent Interfaces: Outline of an Approach to Supporting Operators of Complex Systems. *Human-Computer Interaction*, vol. 3, pp. 87-122 (1987); (4) Geddes, Norman D. and Mark A. Hoffman. *Supervising Unmanned Roving Vehicles Through an Intelligent Interface*; (5) Geddes, Norman D., et al. *Automated Acquisition of Information Requirements for an Intelligent Display*; (6) Miller, Christopher A., et al. Plan-Based Information Requirements: Automated Knowledge Acquisition to Support Information Management in an Intelligent Pilot-Vehicle Interface. Digital Avionics Systems Conference (Seattle, Wash., Oct. 5-9, 1992); (7) Geddes, Norman D., Large Scale Models of Cooperative and Hostile Intentions. *IEEE Computer Society, International Conference and Workshop on Engineering of Computer Based Systems (ECBS'97)* (Monterey, Calif., Mar. 27-28, 1997); (8) Webb, Barry W., Norman D. Geddes, and Leslie O. Neste. *Information Management with a Hierarchical Display Generator*; (9) Rouse, W. B., N. D. Geddes, and J. M. Hammer. Computer-aided fighter pilots. *IEEE Spectrum*. pp. 38-41 (March 1990); (10) Geddes, N. D. and R. J. Lee. Intelligent Control for Automated Vehicles: A Decision Aiding Method for Coordination of Multiple Uninhabited Tactical Aircraft. *Association for Unmanned Vehicle Systems International AUVSI'98 25th Annual Symposium and Exhibition*. (Huntsville, Ala., Jun. 8-12, 1998); (11) Geddes, N. D., R. J. Lee, and J. L. Brown. A Portable Lightweight Associate for Urban Helicopter Pilotage. *Submitted to IEEE* (Sep. 25, 1997); and (13) Geddes, N. D. "Associate Systems: A framework for human-computer cooperation." *7th International Conference of Human-Computer Interaction*. (San Francisco, Calif., Aug. 24-29, 1997).

First, we discuss the one or more planners 302. Any conventional planner can be used with the present invention; however, the preferred embodiment uses a real-time, partial-order, least-commitment planner. Such a planner is able to effectively manage real-time operation in a changing world by planning in an abstraction space. In a SCM system, the current state of the system is constantly changing. For example, new orders are placed, efficiencies change, consumer supply fluctuates, and the availability of labor and parts changes. A system that only plans to the level of detail necessary to ensure feasibility for given constraints conserves resources and/or options by preventing excessive planning and commitment in a dynamic environment where preferences, goals, and intentions are always changing. In one embodiment of the present invention, the partial order, least commitment planner uses an abstract decomposition of the business objectives. This decomposition is represented as a plan and goal graph (PGG), an acyclic, directed graph that represents the hierarchy of possible goals that may be pursued to achieve an intention and the methods (or plans) that can be used to satisfy each goal. Broad, general plans are represented by plan nodes of the PGG that are higher in the directed acyclic graph structure, while lower-level plan sub-elements provide increasing levels of detail in the lower levels of the PGG. A partial order planning system using a plan and goal graph (PGG) is described by N. D. Geddes and R. J. Lee in a paper entitled "Intelligent Control for Automated Vehicles: A Decision Aiding Method for Coordination of Multiple Uninhabited Tactical Aircraft" published June 1998.

Traditional SCM systems use a full-order planner. A planner determines a sequence of activities that can be taken to achieve as many desired states or goals as possible given available resources and domain constraints. A full order planner determines the "optimal" sequence of activities to be taken. Because this process requires searching all combinations of activities to determine the best combination, it is order n-cubed or worse in the number of activities. Partial order planners compute less than the "optimal" sequence of activities to be taken. For example, one type of partial order planner is a least commitment planner that operates by committing to as little as possible, thus reducing exponential growth of the search space resulting in increased planning speed. Since all plans are not necessarily considered, a partial order planner may not find the optimal sequence of activities for reaching one or more goals; however, a plan that satisfies domain and resource constraints will be quickly provided and the resulting plan can be recalculated as changes occur.

Figure 6:
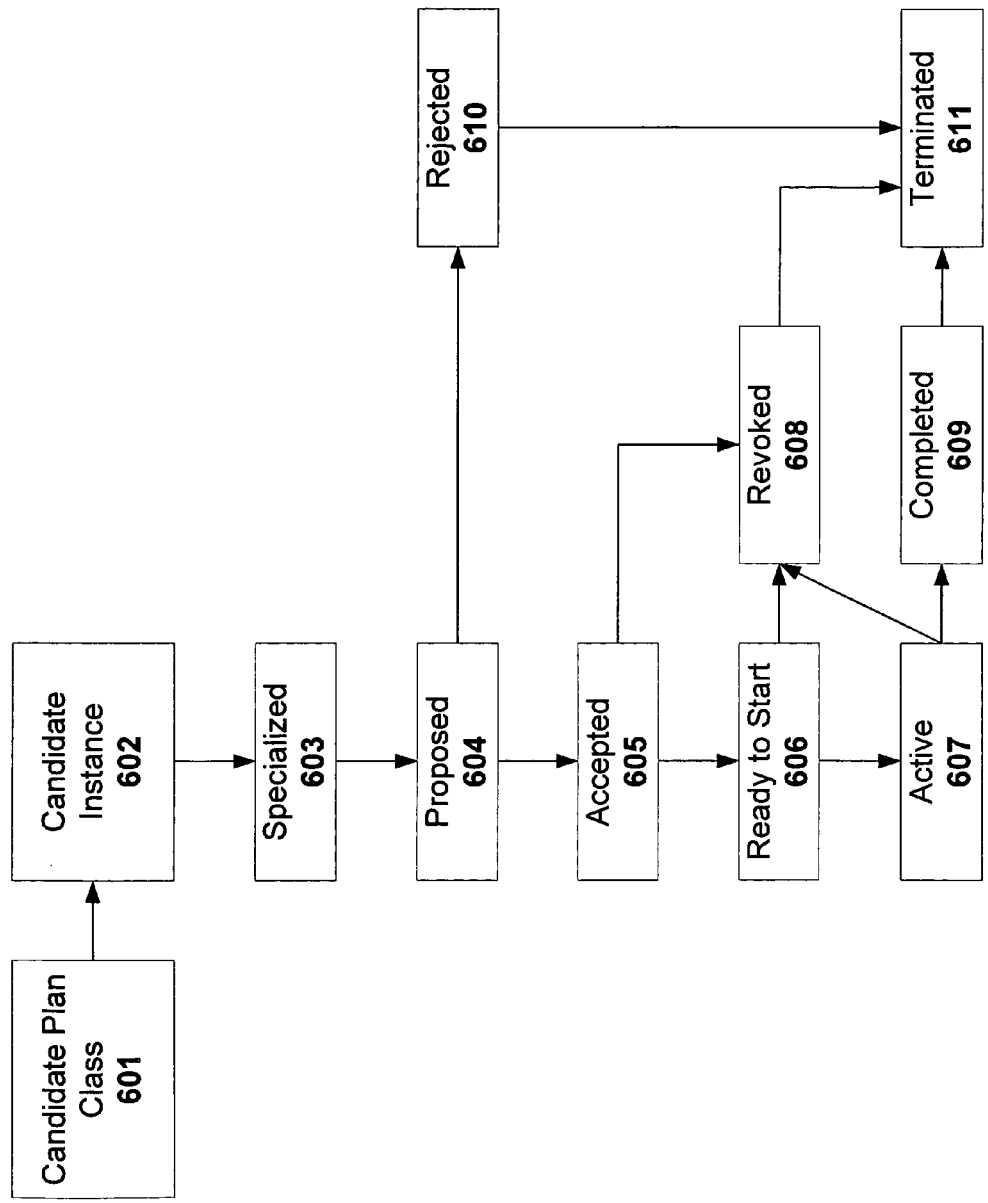
FIG. 6 is a block diagramming describing the life cycle of a plan maintained by a planner according to one embodiment of the present invention.

In one embodiment of the present invention, the planner 302 is a partial order planner and manages its level of commitment to the activities in the plan by using a state transition method to set the life cycle states of plan sub-elements. One embodiment of the plan life cycle state transitions is shown in FIG. 6. As a plan sub-element moves through its life cycle states from candidate towards the active state, the partial order planner is increasing its commitment to that plan sub-element. The partial order planner may also reduce its commitment by changing the plan sub-element state to rejected state or revoked state and ultimately to a terminated state. This mechanism provides a non-monotonic, graded level of commitment for each plan sub-element.

In one embodiment of the present invention, state transitions of the plan sub-elements are performed by the planner 302 in response to event signals received from the situation assessor 307. When the planner 302 moves a plan sub-element to a new life cycle state, the planner 302 requests the activation of specific monitors within situation assessor 307. In one embodiment of the present invention, the monitors represent the conditions under which a plan sub-element should be transitioned to a different one of its plurality of life cycle states. The situation assessor 307 periodically evaluates the specific monitors that have been activated, and provides an event signal to the planner 302 for each specific monitor whose conditions are satisfied.

One embodiment of the present invention includes intent interpreter 303. In this embodiment, the SCM system monitors a user's actions to determine what the user is trying to accomplish. The intent interpreter does this using a task-analytic decomposition of the purposes of users within the business process domain. In one embodiment of the invention, the intent interpreter uses a plan and goal graph (PGG) for its knowledge that is the same as is used by planner 302. Additionally, intent interpreter 303 uses knowledge represented as scripts. These scripts are sequences of partially specified primitive actions whose execution may be dependent on the state of the execution context. Other embodiments may use scripts that may include non-primitive actions (e.g., recursive script calls or additional script calls). Scripts represent standard procedures or business processes that are routinely used to perform specific business processes described by plan sub-elements. Such standard business procedures may include standard responses to both normal and abnormal events and operating conditions within an enterprise. The intent interpreter 303 uses reasoning on the PGG to represent problem solving behaviors that are necessary when existing business processes defined by scripts are not appropriate for the situation. Using assertions made by the other components of the system together with domain knowledge stored in knowledge base 306, the intent interpreter determines the most likely intent of a user. This determined intent is then used to update the information being displayed to the user and to generate one or more plans to satisfy the interpreted goals of the user.

One embodiment of the present invention uses an intent interpreter similar to that described by B. H. Hoshstrasser and N. D. Geddes in a paper entitled "OPAL: Operator Intent Inferencing for Intelligent Operator Support Systems" published July 1989. The intent interpreter includes a model of operator intent expressed as both scripts and plan-goal graphs. The system tries to understand operator actions in terms of its current model of operator intent. An action is said to be "explained" if it is consistent with what was expected by the intent model.

The intent interpreter first tries to interpret the intent of an operator action using script-based reasoning. This is equivalent to evaluating the user's behavior in the context of existing active standard business procedures of the organization. Each active script in the current intent model is examined to determine if the action is an expected step in the execution of the script. If the action matches an event in an open segment of a script, the event is marked as completed and the operator action is explained. All active scripts are searched, even if a match is found early on, since a particular action may occur in more than one active script. When the script-based reasoner runs, it evaluates the termination conditions of each script to determine if any of the scripts should be removed from the current model of intent.

If the action is not predicted by the active scripts, then the system tries plan-based reasoning to explain the action in terms of a plan to satisfy one of the current goals of the operator. In order to do this, the system uses a knowledge base that incorporates domain knowledge and knowledge of the possible plans and goals of the operator. The knowledge base is a relationship-based representation of the plan and goal graph for the given domain. The PGG represents goal-driven problem solving behaviors of the user. The relationships also define how scripts and operator actions are related to the low level plans. Constraints are placed on the relationships to provide a way to account for the context in which the action occurred.

To explain an operator action through plans, the system backward chains through its knowledge base to determine if the action was predicted by any of the current plans and goals of the operator. This may require inferring intermediate plans and goals in order to connect the action to a higher level plan or goal that is already active. These new plans and goals will be invoked and incorporated into the current model of the operator's intent. The intent interpreter 303 uses non-monotonic reasoning to update the model of the user's current intentions. As mentioned earlier, a side effect of inferring a new plan or goal may require revoking other plans and goals that are found to be inconsistent with the newly added plans and goals. Scripts may be activated or revoked by the inferencing of new plans as well. If the system is unable to explain the operator's action either by scripts or plans, it is potentially an operational error by the user.

Intent interpreter 303 is not a necessary component of the present invention; however, the intent interpreter 303 can provide a mechanism for building an intelligent decision support system to assist corporate managers in viewing, analyzing, modifying, simulating, and testing the business processes and the data stored in an SCM system. One embodiment of the present invention includes a partial order planner without an intent interpreter 303. This embodiment can be used to more efficiently perform supply and demand planning in a SCM system.

Script performer 305 can be used to execute multiple parallel situated scripts that are stored in knowledge base 306. As discussed above, these scripts are sequences of partially specified primitive actions whose execution is context sensitive. This component is a valuable tool in increasing the efficiency of the system to support real-time performance. The scripts can be thought of as a knowledge representation optimized for business procedure execution; just as software executables can be viewed as optimized representations of source code.

The information manager 304 component of this embodiment of the present invention provides automatic information management features for the user interface and for collaboration with other participants in the supply chain management system. The information manager 304 uses knowledge stored in knowledge base 306 including the present intent of a user as determined by intent interpreter 303 to decide what information should be displayed to the user and shared with other participants. Information needed by a user changes as the user's tasks and intentions change. This embodiment of the present invention uses a model to determine the information needed based on the current knowledge base.

One embodiment of the present invention uses an information manager 304 similar to that described in an article by B. W. Webb, N. D. Geddes, and L. O. Neste entitled "Information Management with a Hierarchical Display Generator." This article describes an implementation of a system that selects and tailors the format of displayed information to the tasks being performed by a user.

Finally, knowledge base 306 stores all knowledge used in the system to conduct reasoning including plans, scripts, assertions, relationships, frames, etc. The knowledge consists of knowledge patterns and knowledge instances. Situation assessor 307 maintains the consistency of the knowledge instances within the knowledge base 306 by identifying and resolving any inconsistent or outdated beliefs. In one embodiment of the present invention, the situation assessor uses a concept graph to update data values and beliefs. A concept graph is a knowledge representation of the dependencies between observable data values and higher-level computations and assertions made about the data.

In one embodiment of the present invention, the concept graph includes one or more means for calculating the degree of belief that the situation assessor 307 has in the values of each concept. One such means for calculating belief is Bayes Formula. When the situation assessor 307 receives new data, concepts that depend on that data are updated and their belief values are also updated. As a result of the updated belief values, the situation assessor 307 may reduce its belief in a concept, providing for non-monotonic truth maintenance for the situation assessor 307.

Figure 4:
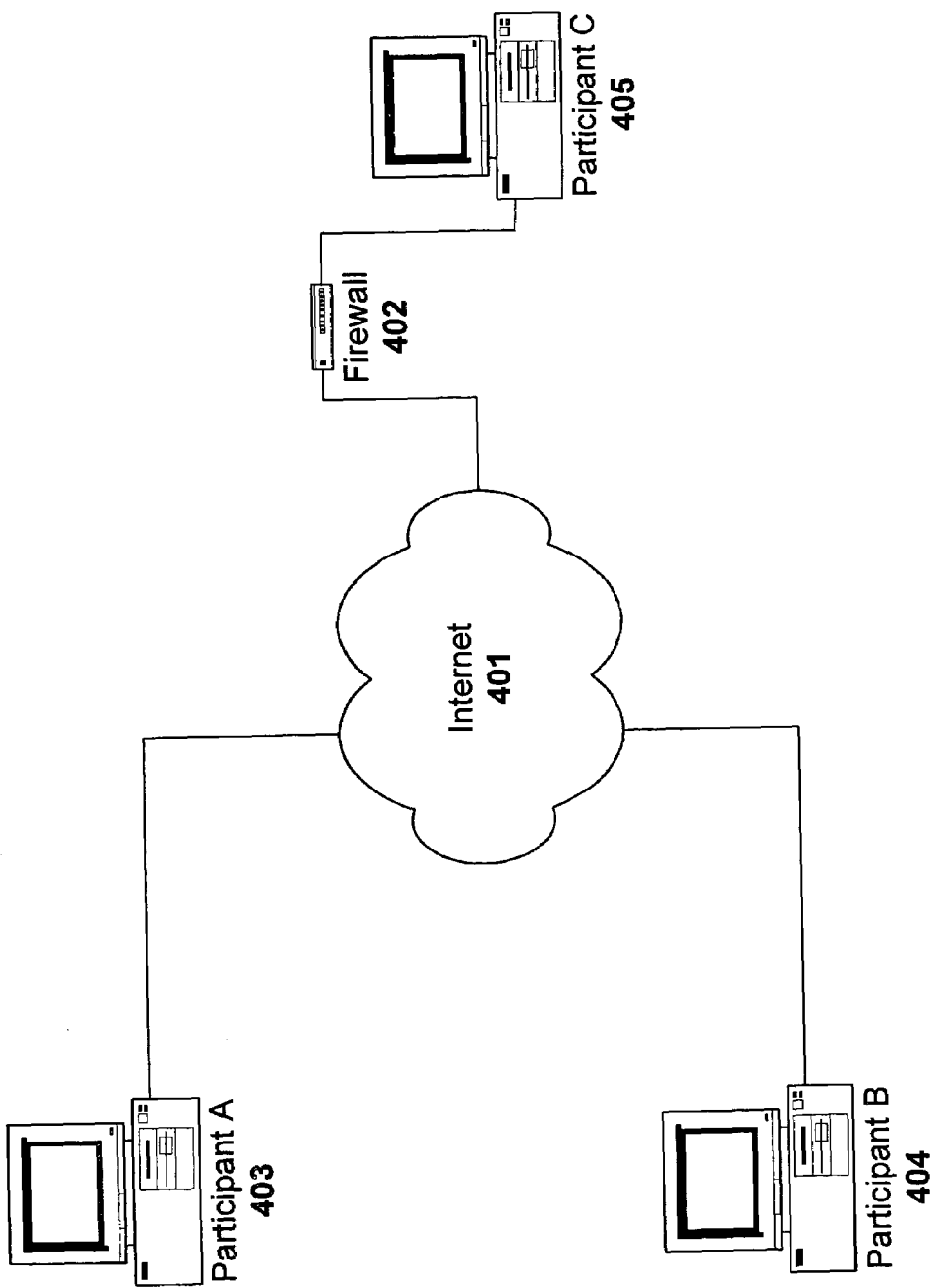
FIG. 4 depicts a network diagram including three participants in a supply chain according to one embodiment of the present invention.

FIG. 4 displays a network diagram according to one embodiment of the present invention. In this embodiment, the supply chain management system is made up of three supply chain participants: participant A 403, participant B 404, and participant C 405. Each of the participants is connected to the Internet 401 using a conventional network connection. Though the SCM system herein described has security features to prevent the unauthorized access of data, participants will likely wish to use a firewall 402 to provide further protection of sensitive corporate data. For example, firewall 402 is used to protect participant C 405.

In this embodiment of the present invention, access permissions are kept for each table of data stored in an access control list (ACL) that is resident within a participant's system. For example, one table stored in the present invention maintains a record for each customer order. The number of orders is relevant in determining and forecasting the demand for products used in the supply chain; however, order data may be sensitive, especially if one of the participants in the supply chain is a competitor.

For example, participant C 405 supplies participant A 403 with liquid crystal display (LCD) panels to be used in personal digital assistants (PDAs). Participant C also manufactures personal digital assistants (PDAs). In this situation, participant C 405 would not wish to share detailed order information with participant A 403 on an unlimited basis and vice versa. However, the two participants do have a defined relationship between the specific production plans for LCD panels of participant C 405 intended for use by participant A 403, and the specific production plans for PDAs using those LCDs by participant A 403. If the two participants agree to share their specific supply and demand plans for the LCDs used by participant A 403, then the specific information related to those plans is allocated to participant A 403 within participant C 405 system ACL and vice versa. This permits each participant system to update each other automatically in the event of changes in the specific production plans or situations they have agreed to share. Neither participant is ever granted access to the other's data through the firewall 402.

Using this embodiment of the present invention, supply chain participants can determine their level of participation in the system by choosing the extent to which they wish to share specific business objectives and plans with other specific participants. The more information that is shared, the more valuable the system becomes; however, participants still see some utility even if very little detail is shared between participants.

Other embodiments of the present invention require greater granularity and control over data security. For example, one embodiment maintains access control lists (ACLs) for each data record used in the SCM system.

Figure 5:
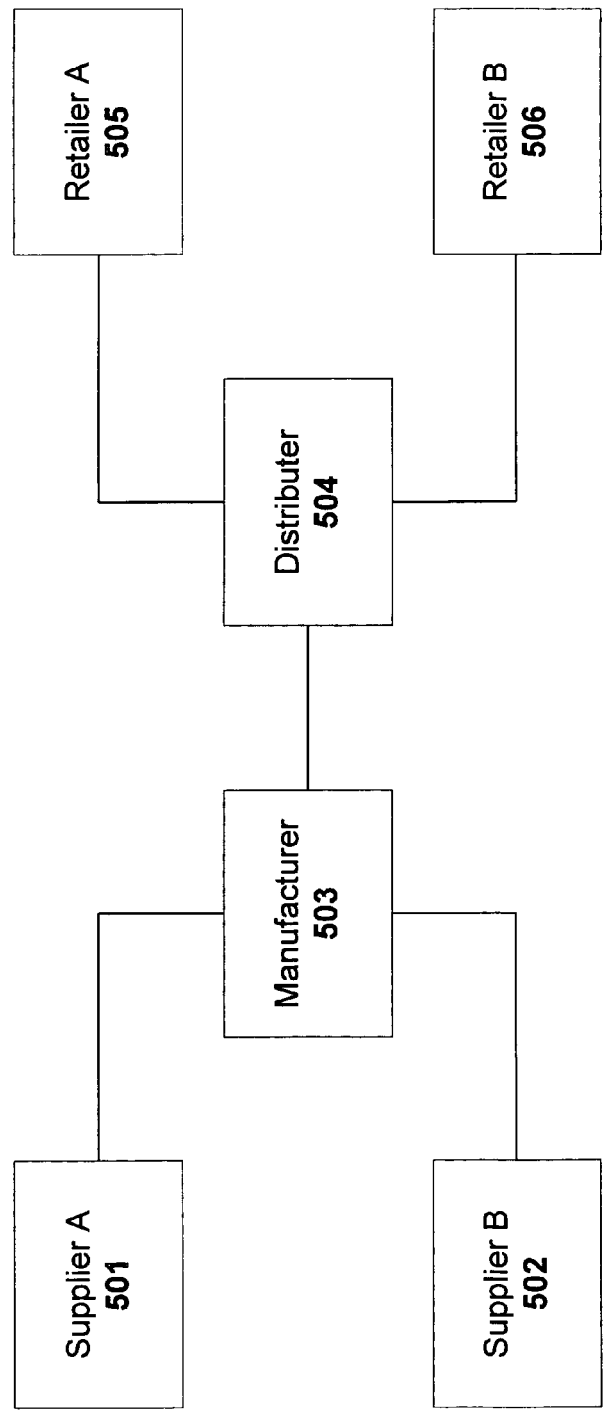
FIG. 5 illustrates a supply chain according to one embodiment of the present invention.

Consider the supply chain shown in FIG. 5. Manufacturer 503 is a company that manufactures widgets made using materials and components supplied by supplier A 501 and supplier B 502. Once the widgets have been manufactured, they are delivered to distributor 504 who in turn delivers widgets to various retailers such as retailer A 505 and retailer B 506.

According to an embodiment of the present invention, each participant in the supply chain shown in FIG. 5 maintains a supply chain management system. Each system maintains metrics such as the amount of inventory, measures of quality, numbers of defects, costs, etc. A security mechanism is provided that protects proprietary business data of each participant from the other participants.

For example, if supplier A 501 and supplier B 502 are each supplying the same components or materials to manufacturer 503, then as direct competitors they most likely would not wish to share cost, inventory, or other business data with each other. However, supplier A 501 and supplier B 502 would not be as opposed to making some data available to manufacturer 503 or others in the supply chain. The system allows each participant to specify whatever security policy they wish.

In a supply chain management system, it is useful for participants to be able to measure the effects that actions made by a participant will have on other participants. For example, the entire supply chain may benefit if supplier A 501 ships widget components one month later than promised, or if supplier B 502 charges a little more for a higher quality product. The present invention can assist participants in sharing information necessary to make these determinations while protecting proprietary corporate data. Supplier A 501 does not need to know how much is costs manufacturer 503 to make a widget. Rather, supplier A 501 needs only know how his or her actions will affect manufacturer's 503 bottom line. One embodiment of the present invention includes a method and system for sharing the change in value caused by other participant's actions. Each participant needs only to know how his or her actions will affect the other participant's value. This is implemented using a measure of the cash value added or the estimated relative value added by a participant.

In one such embodiment, a cash value added (CVA) accounting system is used whereby each participant computes and shares the effects of actions taken by participants in the supply chain by sharing changes in cash value.

In one embodiment of the present invention, the plans and situations shared by a set of distributed supply chain management systems that contain inference engines after the present invention are used by the inference engines to detect conflicts in planning between the collaborating companies. When a new or updated plan is received from a collaborating party by a second collaborating party, the supply chain management inference engine of the second party evaluates the plan provided by the first party for conflicts with any existing plans of the second party. The knowledge base 306 contains specific knowledge defining how plans and goals can be in conflict. In one embodiment, the plan and goal conflict detection uses the approach described in Geddes, N. D., A model for intent interpretation for multiple agents with conflicts (1994). When conflicts are detected with shared plans, the conflicting parties are both notified about the detailed nature of the conflict using the information manager 304.

The following is an illustrative embodiment showing the interactions between the various components of the inference engine. Consider an intelligent decision support system to assist a human in collaborative supply chain management across several companies in a supply chain.

The starting point for the planning cycle is the posting of a high-level goal instance from a plan-goal graph (PGG). The posting of a goal triggers a planning cycle that involves decomposing and specializing high-level goals into low-level actions that can be executed to achieve that goal. Each goal in the PGG has one or more child plans, some of which can be executed directly and some that must be recursively decomposed into sub-goals and sub-plans and specialized until the primitive steps are reached. Because the planner is a least commitment planner, commitment to a specialization created during decomposition is limited to only those aspects of the plan for which commitment cannot be deferred. If the system has been configured to interact closely with a human, candidate plans that are successfully decomposed and specialized may be proposed to the operator.

In addition to creating the decomposition of a plan into its sub-elements, the planner manages the specific life cycle states of each sub-element of a plan. The life cycle states, depicted in FIG. 6, provide the mechanism for managing the commitment of the system to the each of the plan sub-elements. Each of the life cycle states of a plan sub-element has specific monitoring knowledge associated with it, serving to focus the processing of the situation assessor and providing for an event-based control of the planner.

Throughout the life cycle of a PGG plan or goal, the dynamic planner maintains the parameters of the plan or goal and monitors for its success or failure. As a result, the planner can dynamically adjust plan parameters that mediate its execution and dynamically reselect and specialize children of a node as required.

The operation of the system begins in the situation assessor 307. In the simplest embodiments, this component monitors and reads inputs to the system. The situation assessor 307 uses the inputs it receives to add data to the knowledge base regarding the current state of the system. For example, in the present embodiment, the system monitors a user's key presses and mouse clicks to add facts or observations to the knowledge base 306. It may also collect data from factory data systems and financial systems to update the situation of importance to supply chain management.

Figure 7:
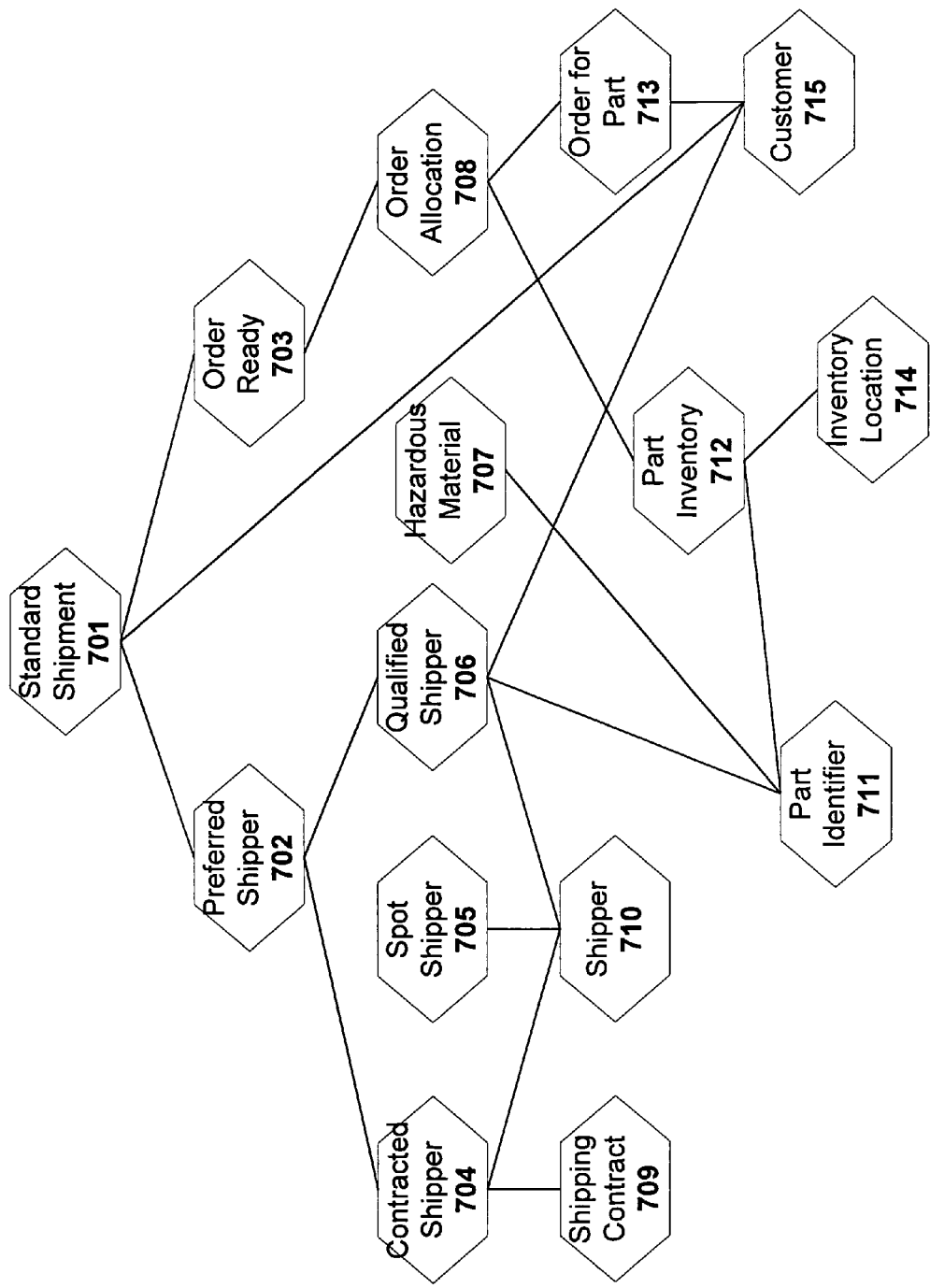
FIG. 7 illustrates a portion of a concept graph according to one embodiment of the present invention.

FIG. 7 shows a concept graph according to one embodiment of the present invention. The situation assessor 307 stores knowledge about the situations of possible interest in the knowledge base 306 in the form of a concept graph such as the one shown in FIG. 7. The concept graph specifies the relationships between lower level data and higher level concepts. The situation assessor 307 creates concept instances which represent specific data and conclusions that it determines based on its data inputs. The concepts may represent highly aggregated and abstract conclusions about the situation of the supply chain. Each concept is capable of having monitors defined for it that can be activated by the planner 302 as the life cycle states of plans and goals change over time. For example, in FIG. 7, the concept graph shows the relationship between the concept of Standard Shipment 701 and the concepts of Preferred Shipper 702, Order Ready 703, and Customer 715.

A monitor is a data input that can be defined by the system. Instead of monitoring all possible inputs at one time, embodiments of the present invention provide a mechanism for identifying what data is actually needed. A monitor corresponding to the needed data is then activated so that the needed data can be collected and used in the decision support process.

For example, one embodiment of the present invention includes monitors for various warehouse metrics including the percentage of warehouse use, the change in percentage of warehouse use, the number of square feet used in the warehouse, etc. Though the system may have access to all of this data, the data is not calculated unless a corresponding monitor is active. Monitors can be associated with nodes in a concept graph or a PGG. The system can then activate a monitor when the data is needed to avoid needless data collection and calculation.

In this embodiment, the situation assessor 307 can also send and receive copies of concept patterns and instances by communicating with other supply chain management systems also containing a situation assessor 307 and a knowledge base 306. The communication may be achieved by a plurality of methods including local networks, direct connection and wide area networks such as the Internet.

Whenever a new fact is added to the knowledge base 306, the situation assessor 307 processes any monitors related to the new fact. If a monitor is found to be satisfied, an event is generated to the planner 302 that causes the planner to update its planning.

Whenever a new fact is added to the knowledge base 306 that represents the execution of a primitive action by the user, the intent interpreter 303 processes the new assertion to update a model of the current intent of the user. The intent interpreter uses a PGG model of user intentions such as the portion of the one shown in FIG. 8.

Figure 8:
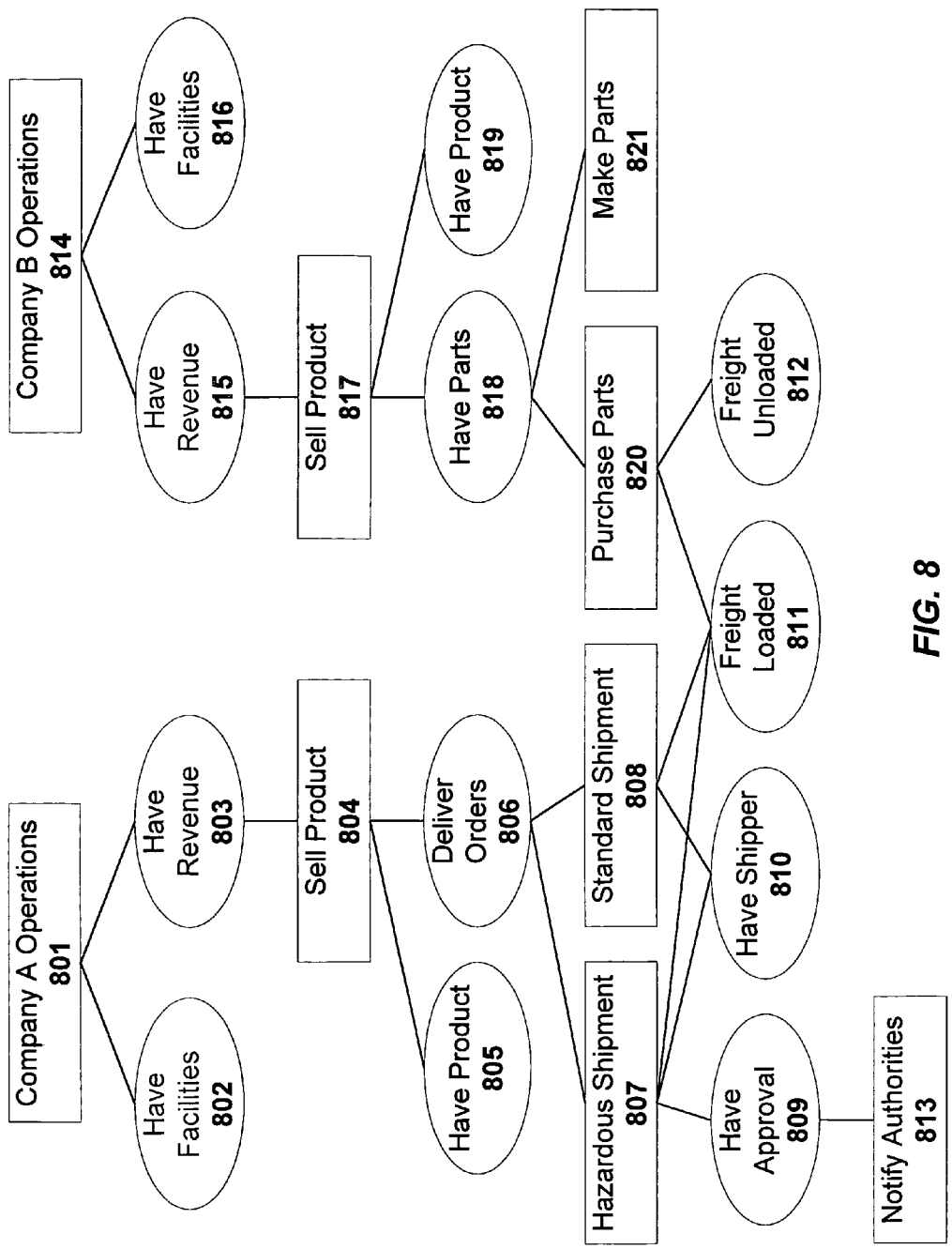
FIG. 8 illustrates a portion of a plan-goal graph (PGG) according to one embodiment of the present invention.

FIG. 8 shows a PGG model of user intentions. For example, the top-level plans include Company A Operations 801 and Company B Operations 814. These plans can be decomposed into goals. For example, Company A Operations 801 can be decomposed into two goals: (1) Have Facilities 802 and (2) Have Revenue 803. These goals can, in turn, be decomposed into further plans and so on. A plan may also have a script for completing a plan associated with it or a goal may be fully decomposed into one or more primitive actions.

The intent interpreter 303 searches through the system's PGG models of user intention to determine the possible and likely intentions of the current user. The intent interpreter 303 then instantiates one or more goals based on the current perceived intentions of the user.

Figure 9:
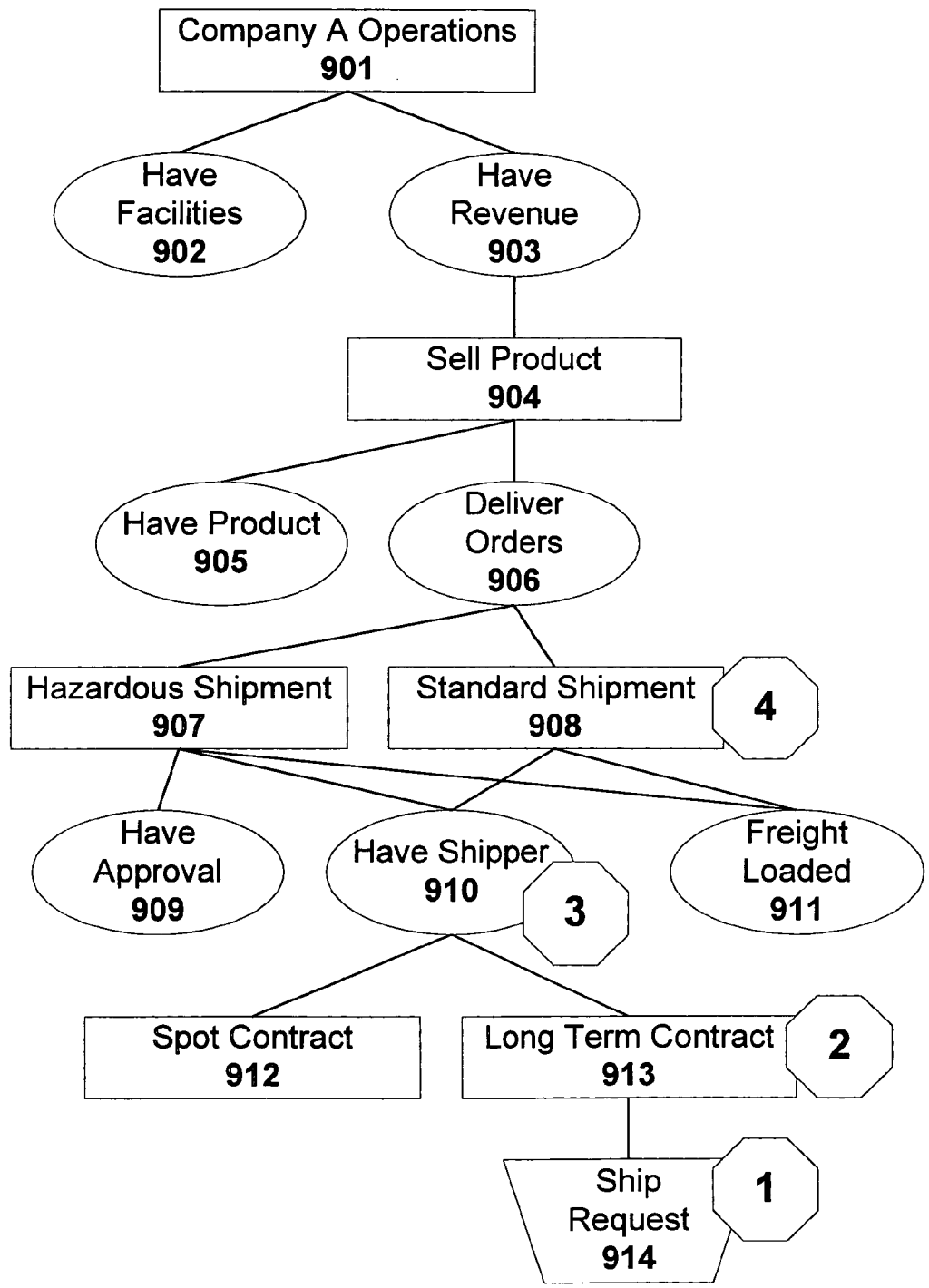
FIG. 9 describes a goal instance created by an intent interpreter according to one embodiment of the present invention.

In FIG. 9, a user at Company A performs a primitive step or action at the user interface by placing a shipping request 914 (1) with a specific shipping company to carry a load of parts to a particular destination. The intent interpreter 303 searches for an explanation of this action, and finds in the knowledge base that the shipping company has a long term shipping contract with Company A. The intent interpreter 303 tentatively hypothesizes that the user plans to use a long term shipping contract 903 as the plan (2) for satisfying the goal to have a shipper 910 (3). The intent interpreter 303 then searches for a higher level plan within the knowledge base 306 that explains the goal, and finds that there is an active plan for using standard shippers 908 (4) to deliver orders of the parts. Hence, the intent interpreter 303 instantiates the plan (2) and the goal (3) within the knowledge base 306. The posting of the new goal starts the planner 302 to consider if there are more effective alternative plans for the goal, such as using a spot shipment contract.

The intent interpreter 303 uses non-monotonic reasoning in its search through the PGG knowledge in the knowledge base 306. If it is unable to find a complete path in the PGG from a hypothesized node to one known to be active, it can back up, retract its earlier assumptions and explore other paths.

In this embodiment, the intent interpreter 303 also sends and receives copies of plan and goal patterns and instances by communicating with other supply chain management systems that contain an intent interpreter 303 and a knowledge base 306. The communication may be achieved by a plurality of methods, including local network, direct connection, and wide area networking such as the Internet.

Whenever a goal changes, or whenever a monitor event is received from the situation assessor 307, the planner 302 determines if any further planning needs to take place. For example, if the intent interpreter 303 instantiates a new goal, then the planner 302 needs to create a plan for achieving that goal. In the preferred embodiment, the planner 302 is a least commitment planner that performs a search of the PGGs stored in knowledge base 306 to determine subgoals and actions that need to be taken.

When goal instances and plan instances change life cycle state, the planner 302 uses knowledge in the knowledge base 306 to determine if any of the newly changed or updated goal or plan instances are in conflict with any other goal or plan instances. If a conflict is detected, the planner 302 sends a notification to the user interface.

Figure 10:
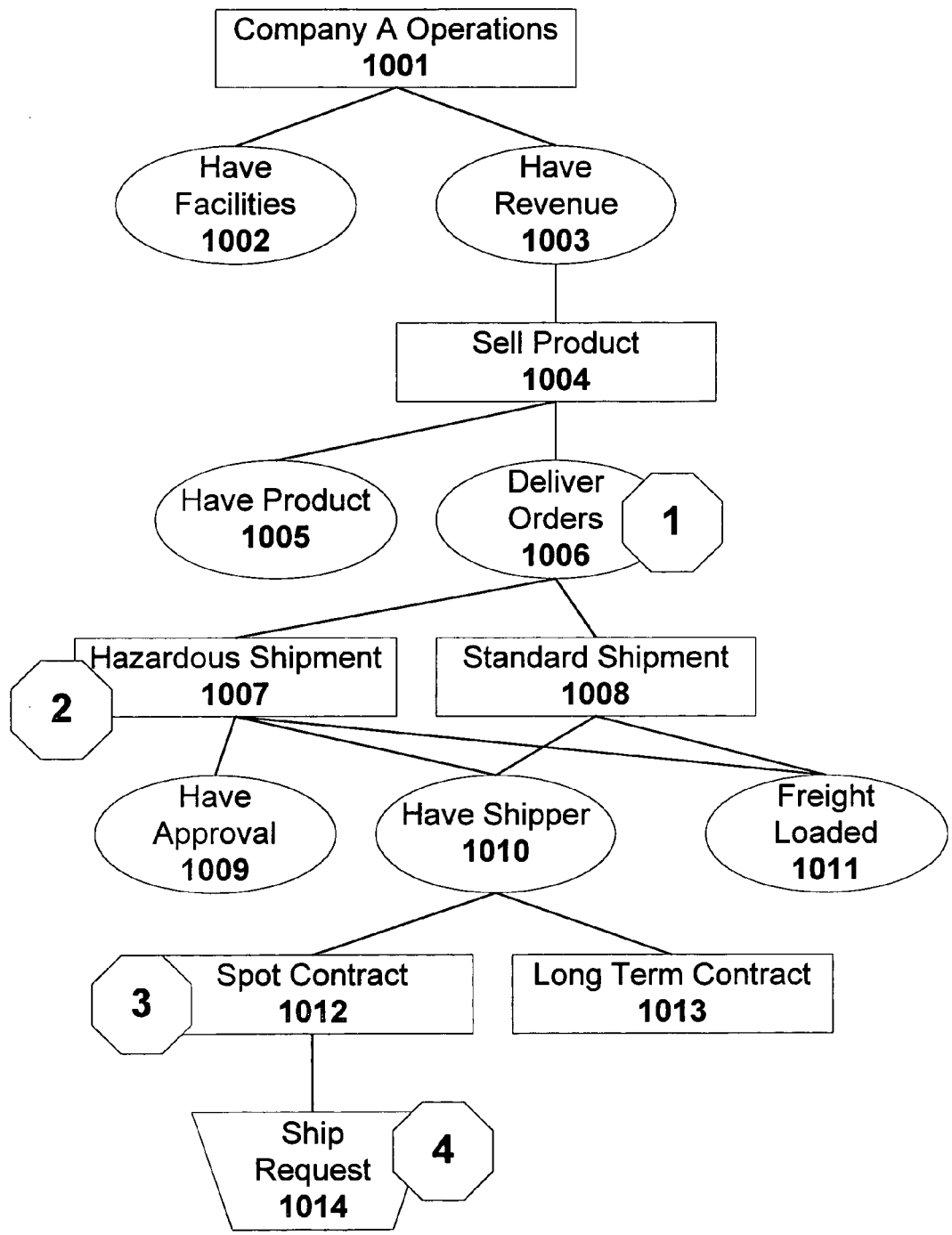
FIG. 10 depicts a portion of a plan-goal graph (PGG) illustrating the operation of a planner according to one embodiment of the present invention.

In FIG. 10, a user at Company A enters data defining the goal to deliver a shipment 1006 (1) of vinyl chloride to Company B in response to an order. The planner 302 uses knowledge in the knowledge base 306 to determine that the material to be shipped is a designated hazardous material, and considers the hazardous shipment plan 1007 (2). This plan has three subgoals, the first of which is to have approval 1009 to ship the material over a specific route, the second subgoal is to have a shipper identified 1010, and the final subgoal is to have the freight loaded 1011. The planner 302 uses knowledge in the knowledge base 306 to determine that the shipper should not be chosen until after the approval is obtained, so reasoning about the shipper is deferred until later. Once approval is obtained, a monitor is satisfied and the planner 302 can resume the solution of the shipper goal. The planner 302 determines that a spot contract 1012 (3) will be more effective than a long term contract and proposes this solution, leading to action (4).

One optimization that is made in the present embodiment is the use of script performer 305. In a particular domain, many plans are commonly encountered and constitute a body of accepted methods known to practitioners within the domain. These plans can be implemented as scripts that represent partially specified procedures that can be executed without the need for extensive planning. The script performer 305 is a component of the present embodiment that facilitates the execution of scripts. These scripts are represented in the system's PGGs that are a part of the knowledge base 306. The script performer 305 can perform many and possibly all of the primitive actions that could be performed by a human user, but the script performer 305 is limited by a set of permissions provided by the human operator.

As an example, consider the goal of having approval to ship a load of hazardous material, and its child plan of notifying the involved parties, which may include national, state and local authorities, the shipper, and the receiver. Because the process of notifying the involved parties is a well-defined and frequently recurring sequence of primitive actions, it can be represented as a script. The representation of the goal, its child plan, the script, and the relationship between the plan and the script are all a part of the knowledge base 306.

When a specific instance of the goal of having approval to ship hazardous material is created, such as the goal for having approval to ship 50 kilograms of plutonium from Idaho National Laboratory to Los Alamos during the week of June 23, the planner 302 can create the instance of the plan to notify specific organizations of the shipment. If the script performer 305 has been given permission, it can execute the script and automatically send the shipping notifications to the necessary involved parties.

The components described above provide a mechanism for assessing the current situation or state of system, planning one or more responses and executing the course of action. The information manager 304 is used to display information to a user or to update the user's display based on the current intentions or plans that have been identified by the planner 302 and the intent interpreter 303 using the knowledge base 306, the script performer 305, and the situation assessor 307.

For example, the knowledge base 306 contains a representation of the information that a human user would need to access if he was involved in a plan to ship a load of hazardous material. One type of information relevant to a plan of this kind might be the weather conditions between the source and the destination of the shipment. When an instance of such a plan is created, such as shipping plutonium from Idaho to Los Alamos, the information manager 304 uses the attributes of the plan and the knowledge base 306 to determine that the weather between Idaho and Los Alamos during the week of the shipment is of interest to the human. The information manager 304 then commands the display presentations to show the weather forecast map for the correct region and time period.

Illustrative embodiments of the present invention have now been described. It will be appreciated that these examples are merely illustrative of the present invention. Many variations and modifications will be apparent to those of ordinary skill in the art.

The invention claimed is:

1. A supply chain management system comprising:
   a knowledge base including expert knowledge about one or more business process domains, wherein the knowledge base includes one or more concept graphs;
   an inference engine coupled to the knowledge base, the inference engine including a partial order planner;
   a management system that collects and distributes data regarding one or more business processes and determines one or more goals; and
   a graphical user interface system that displays information regarding the one or more business processes;
   wherein the inference engine uses the partial order planner to determine a plan for achieving at least one of the one or more goals.

2. The system of claim 1, wherein the knowledge base includes one or more plan-goal graphs.

3. The system of claim 1, wherein the inference engine creates one or more plan instances.

4. The system of claim 3, wherein the inference engine manages life cycle states of the one or more plan instances according to a commitment level of the partial order planner.

5. The system of claim 4, wherein the inference engine manages monitoring of the situation using the one or more concept graphs according to the life cycle states of the one or more plan instances.

6. The system of claim 5, wherein the inference engine determines what further processing is needed by the partial order planner based on the monitoring of the situation.

7. The system of claim 1, wherein at least one of the one or more concept graphs includes a non-monotonic model of economic benefit provided by the plan instances created by the inference engine.

8. The system of claim 1, wherein the knowledge base includes one or more scripts, each of the one or more scripts comprising a sequence of fully or partially-specified actions.

9. The system of claim 1, wherein the inference engine includes an intent interpreter.

10. The system of claim 1, wherein the inference engine includes a non-monotonic truth maintenance system.

11. The system of claim 1, wherein the knowledge base includes tables of data, each table storing zero or more data records.

12. The system of claim 11, further comprising a data security mechanism that protects data stored in the knowledge base.

13. The system of claim 12, wherein the data security mechanism maintains an access control list for one or more tables in the knowledge base.

14. The system of claim 13, wherein the data security mechanism maintains an access control list for one or more data records in the knowledge base.

15. The system of claim 1, wherein the partial order planner is a least commitment planner.

16. A supply chain management system comprising:
    a plurality of intelligent agents, each of the plurality of intelligent agents including:
       a knowledge base including expert knowledge about one or more business process domains, wherein the knowledge base includes one or more concept graphs;
       an inference engine coupled to the knowledge base, the inference engine including a partial order planner;
       a data management system that collects and distributes data regarding one or more business processes; and
       a graphical user interface system that displays information regarding the one or more business processes;
       wherein the inference engine uses the partial order planner to determine a plan for achieving at least one of the one or more goals.

17. The supply chain management system of claim 16, wherein each agent of the plurality of intelligent agents determines the intentions of one or more users and wherein the data management system of a first agent of the plurality of intelligent agents shares data with a second agent of the plurality of intelligent agents representing the determined intentions of the one or more users to facilitate collaboration.

18. The supply chain management system of claim 17, wherein the system uses the shared data to automatically detect conflicts between the one or more users.

* * * * *